United States Patent [19]
Udagawa

[11] Patent Number: 5,306,024
[45] Date of Patent: Apr. 26, 1994

[54] METAL GASKET WITH LOW HEAT TRANSMISSION

[75] Inventor: Tsunekazu Udagawa, Ichikawa, Japan

[73] Assignee: Ishikawa Gasket Co., Ltd., Tokyo, Japan

[21] Appl. No.: 53,547

[22] Filed: Apr. 29, 1993

Related U.S. Application Data

[62] Division of Ser. No. 736,965, Jul. 30, 1991, Pat. No. 5,232,229.

[30] Foreign Application Priority Data

Aug. 7, 1990 [JP] Japan .................................. 2-83094

[51] Int. Cl.$^5$ ............................................. F16J 15/12
[52] U.S. Cl. ................................... 277/235 B; 277/180
[58] Field of Search ..................... 277/235 B, 180, 236, 277/235 A, 22, 26

[56] References Cited

U.S. PATENT DOCUMENTS 1,782,087 11/1930 Bailey .............................. 277/235 B
1,840,147 1/1932 Woolson ........................ 277/235 B

FOREIGN PATENT DOCUMENTS 0169647 7/1986 Japan .............................. 277/235 B
1549200 7/1979 United Kingdom ............ 277/235 B Primary Examiner—William A. Cuchlinski, Jr.
Assistant Examiner—Daniel G. DePumpo
Attorney, Agent, or Firm—Kanesaka & Takeuchi

[57] ABSTRACT

A metal gasket of the invention is designed to reduce heat transfer between two engine parts. The gasket is formed of at least two plates having holes to be sealed and bolt holes, a sealing device formed around the hole to be sealed, and a space forming device formed on at least one of the plates to separate the plates apart. Spacers are formed around the bolt holes so that bolts can be tightened up to a predetermined thickness. When the gasket is tightened, the sealing device is compressed to seal around the hole, but the two meal plates do not closely abut against each other by means of the space forming device. Accordingly, heat is partly radiated through the gasket, and heat transmission between the engine parts is reduced.

7 Claims, 3 Drawing Sheets

METAL GASKET WITH LOW HEAT TRANSMISSION

This is a divisional application of Ser. No. 736,965 filed on Jul. 30, 1991 now U.S. Pat. No. 5,232,229.

BACKGROUND OF THE INVENTION AND RELATED ART STATEMENT

The present invention relates to a metal gasket with low heat transmission. In particular, heat transmission between engine parts is reduced by the gasket of the invention.

A metal gasket, such as a steel laminate gasket, has been known and used for sealing between engine parts, such as between a cylinder block and a cylinder head and between a cylinder head and an exhaust manifold.

The steel laminate gasket comprises at least two metal plates and sealing devices, such as beads, formed around holes to be sealed. One or more metal plate may be installed between the metal plates. When the steel laminate gasket is tightened, the beads are compressed and all the plates substantially abut against each other without space therebetween.

Accordingly, although the steel laminate gasket can securely seal between the engine parts, heat between the engine parts is substantially completely transmitted through the gasket.

In an engine equipped with an inlet manifold, pressure and temperature applied to the inlet manifold are relatively low when comparing with those applied to an exhaust manifold. Therefore, a conventional gasket made of asbestos, glass fibers, carbon fibers or other gasket materials has been used as an inlet manifold gasket.

Recently, an engine is required to provide high power in small size. Temperature in the new engine becomes high when operated, but heat does not generally affect engine parts while the engine is operated because the engine is cooled. However, when the engine is stopped, heat by the engine affects the engine parts, such as the inlet manifold, and may cause trouble in starting an engine with a fuel injection system, which is attached to the inlet manifold.

Namely, in case a car is stopped for a while to allow the engine to cool down, heat by the engine does not affect the fuel injection system attached to the inlet manifold. However, in case a car is started within a short period of time after the car was stopped, heat from the cylinder head is transferred to the inlet manifold through a gasket and causes vapor lock at the fuel injection system. Namely, the engine may not be started until the engine is cooled.

In order to reduce heat transmission from the engine to the inlet manifold, a gasket with heat insulating characteristics is required. The conventional gasket made of asbestos or a conventional gasket material is low in heat transmission, but such material is not good as a gasket with heat insulating characteristics.

A conventional steel laminate gasket has high heat transmission characteristics, but heat is transmitted instantly from the cylinder head to the inlet manifold through the steel laminate gasket. Therefore, the conventional steel laminate gasket can not be used as a gasket for the inlet manifold.

Accordingly, one object of the present invention is to provide a metal gasket, which can reduce heat transmission between two engine parts.

Another object of the invention is to provide a metal gasket as stated above, which can radiate heat from the engine parts.

A further object of the invention is to provide a metal gasket as stated above, wherein two engine parts can be sealed effectively.

A still further object of the invention is to provide a metal gasket as stated above, which can be easily and economically manufactured.

Further objects and advantages of the invention will be apparent from the following description of the invention.

SUMMARY OF THE INVENTION

In accordance with the invention, a metal gasket is installed between two engine parts with at least one hole to be sealed. The gasket can securely seal between the two engine parts while reducing heat transmission therebetween. Namely, although one of the engine parts is heated, such heat is not directly transmitted to the other of the engine parts. Heat is partly radiated by the metal gasket.

The gasket is basically formed of two metal plates extending substantially throughout the entire area of the gasket. The metal plates are provided with first holes corresponding to the holes of the engine parts to be sealed, and bolt holes for attaching the metal plates to the engine parts. The gasket also includes sealing means formed around the first holes, and space forming means formed on at least one of the metal plates to keep the metal plates separated from each other.

Spacers are formed around the bolt holes. The thickness of the spacer is less than the thickness of the sealing means before the gasket is compressed. Therefore, when the gasket is tightened at the spacers, the sealing means is compressed to seal around the hole of the engine parts, but the two metal plates do not closely abut against each other. The space forming means forms space between the two metal plates to thereby reduce heat transmission between the two engine parts.

Namely, when the gasket is tightened at the spacers, the sealing means is compressed to seal around the holes of the engine parts. However, since the two metal plates do not closely abut against each other by the space forming means, heat is not directly transmitted through the metal plates, and heat is partly radiated through the space.

The space forming means may be a plurality of projections formed on at least one of the metal plates. The projections may be intermittent projections or continuous projections such as beads. Also, the sealing means may be a bead formed on at least one of the metal plates around the first holes.

A heat insulating layer may be formed on at least one of the metal plates. Also, a heat insulating plate or other metal plate may be laminated further with the metal plates.

DETAILED DESCRIPTION OF PREFERRED EMBODIMENTS

Figure 1:
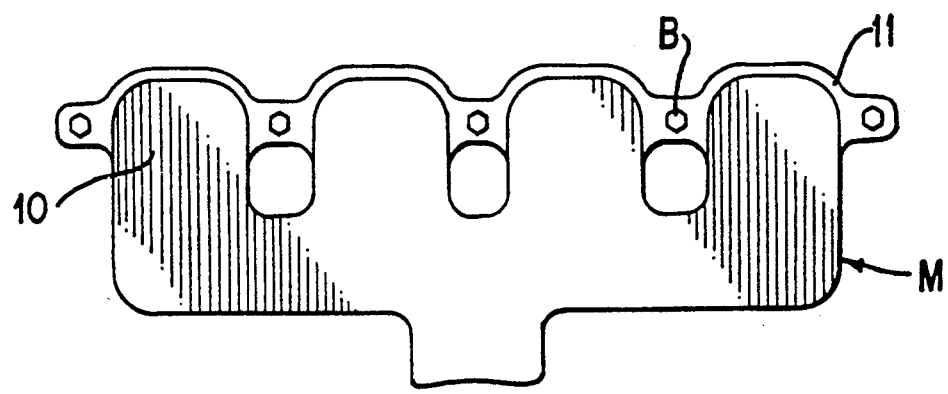
FIG. 1 is an explanatory side view of an inlet manifold.
Figure 2:
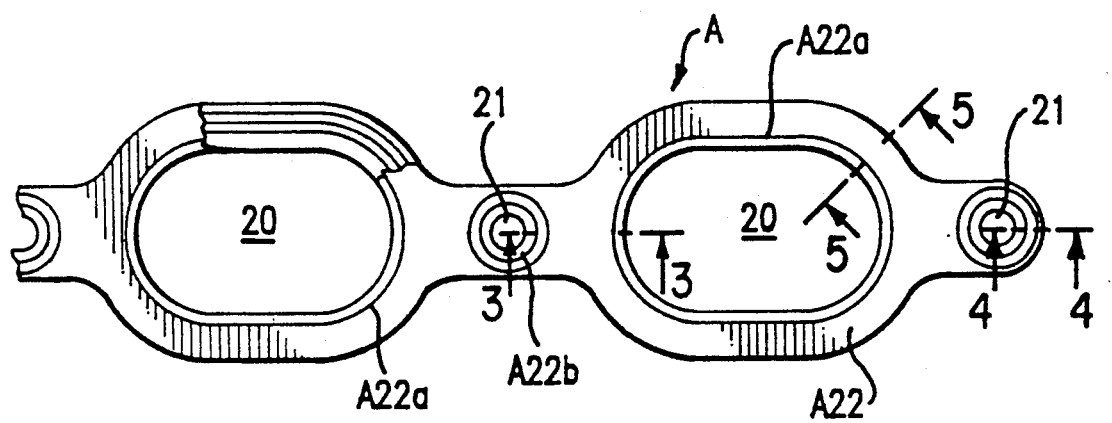
FIG. 2 is a partly cut plan view of a first embodiment of a metal gasket of the present invention.
Figure 3:
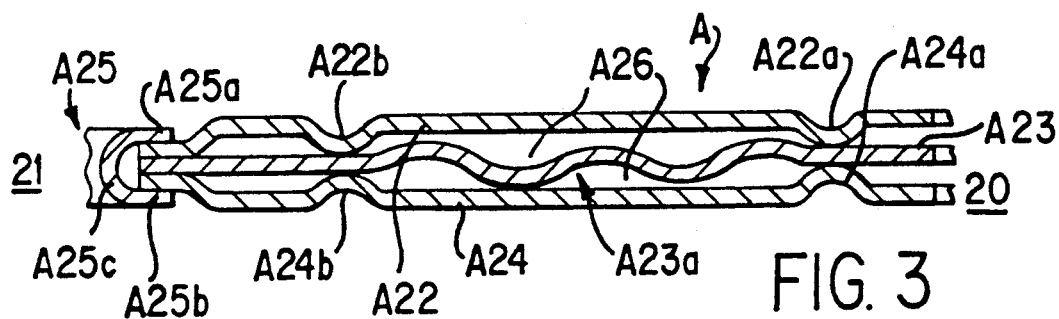
FIG. 3 is an enlarged section view taken along a line 3—3 in FIG. 2.

Referring to FIG. 1, an inlet manifold M is shown. The inlet manifold M includes inlet pipes 10 to be communicated with respective cylinders of an engine, and a flange 11 with bolt holes (not shown). The inlet manifold M is attached to a cylinder head through a gasket A by means of the bolts B passing through the bolt holes.

As shown in FIGS. 2-5, the gasket A includes a plurality of holes 20 through which air inhaled from the inlet pipes 10 flows to the cylinders, and a plurality of bolt holes 21. The bolts B pass through the bolt holes 21 and are fixed to the cylinder head.

The gasket A is formed of an upper plate A22, a middle plate A23 and a lower plate A24 laminated with each other. Also, a grommet A25 is installed around the bolt holes 21. The upper and lower plates A22, A24 are the same and are arranged symmetrically relative to the middle plate A23.

The upper plate A22 includes holes corresponding to the holes 20, 21, beads A22a formed around the holes 20, and beads A22b formed around the bolt holes 21. When the gasket A is tightened, the beads A22a are compressed to seal around the holes 20. The beads A22b are compressed as well, but the beads A22b operate as a space forming member. The beads A22b are not used to seal around the bolt holes 21.

The middle plate A23 includes holes corresponding to the holes 20, 21, and a plurality of corrugations A23a. The corrugations A23a operate as a space forming member.

The lower plate A24 also includes holes corresponding to the holes 20, 21, beads A24a formed around the holes 20, and beads A24b formed around the bolt holes 21. The beads A24a seal around the hole 20, but the beads A24b operate as a space forming member.

The grommet A25 has upper and lower flanges A25a, A25b, and a curved portion A25c to define the bolt hole 21. The upper flange A25a is located above the upper plate A22, while the lower flange A25b is located under the lower plate A24. The grommet A25 operates as a spacer for the gasket A.

The distance of the grommet A25 between the outer surfaces of the upper and lower flanges A25a, A25b is shorter than the distance between the outer surfaces of the upper and lower plates A22, A24 before the gasket A is compressed. The grommet A25 is not compressed when the gasket is tightened.

When the gasket A is tightened, the distance between the upper and lower plates A22, A24 is compressed to the thickness or distance of the grommet A25. Therefore, the beads A22a, A24a are compressed to seal around the hole 20. The beads A22b, A24b are compressed as well, but the beads A22b, A24b need not seal around the hole 21. The corrugations A23a are slightly compressed when the gasket A is tightened, but the corrugations A23a form spaces A26 between the plates.

Namely, when the gasket A is tightened, the portions around the bolt holes 21 and the holes 20 are tightly compressed, but the spaces A26 are formed between the plates. The plates A22, A23, A24 do not closely abut against each other.

Figure 4:
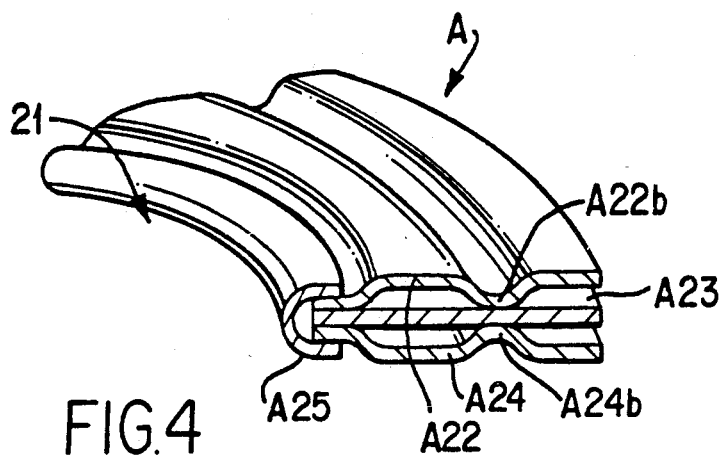
FIG. 4 is an enlarged section view taken along a line 4—4 in FIG. 2.
Figure 5:
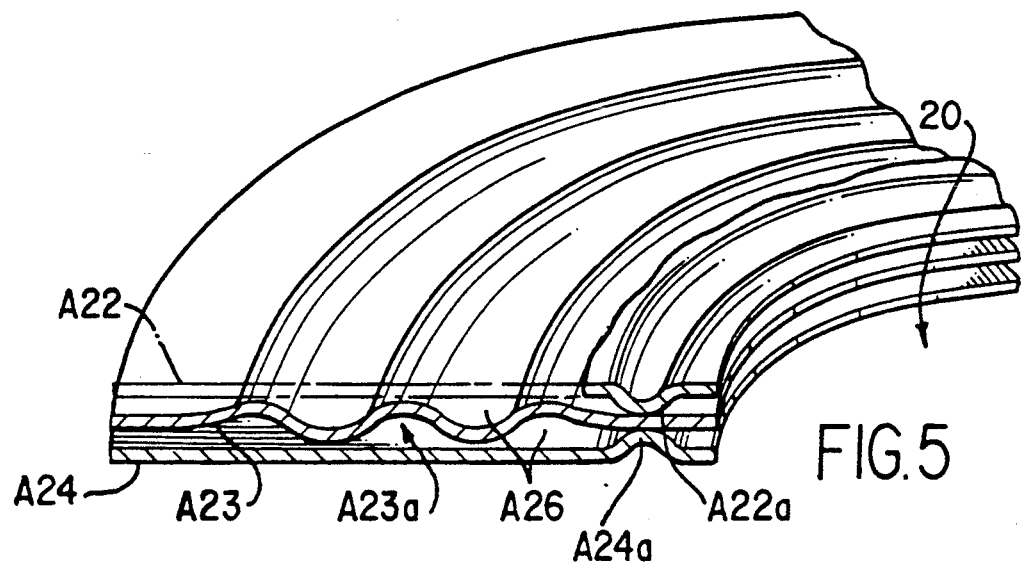
FIG. 5 is an enlarged section view taken along a ling 5—5 in FIG. 2.

As shown in FIGS. 4 and 5, outer peripheries of the plates A22, A23, A24 are arranged substantially parallel to each other, and the spaces A26 between the plates open outwardly. Even if the gasket A is tightened, the spaces 26 between the plates are substantially maintained throughout the gasket A.

Accordingly, in case the cylinder head is heated, heat is isolated by the spaces 26 of the gasket A and is not transferred. Heat at the cylinder head is not directly transmitted to the inlet manifold. Therefore, in case an engine is stopped, the inlet manifold is not heated extremely by heat of the cylinder head. Even if the engine is started shortly after the engine was stopped, vapor lock does not occur at the fuel injection system.

Figure 6:
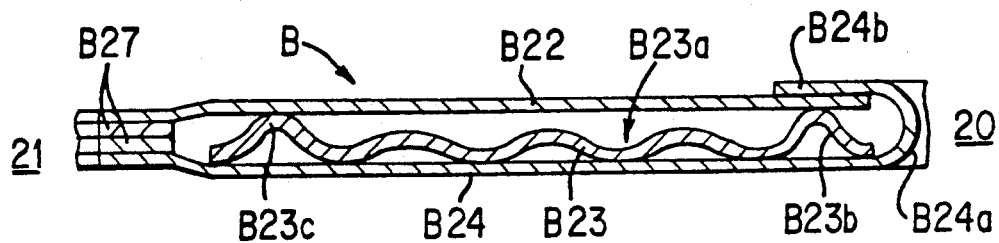
FIG. 6 is a section view, similar to FIG. 3, of a second embodiment of a metal gasket of the invention.

FIG. 6 shows a second embodiment B of a metal gasket of the invention. The gasket B includes an upper plate B22, a middle plate B23 and a lower plate B24. The upper plate B22 is made of a heat insulating material, such as zirconium oxide, silicon nitride and the like.

The middle plate B23 includes corrugations B23a, a bead B23b around the hole 20, and a bead B23c around the hole 21. The corrugations B23a operate to separate the upper and lower plates B22, B24 with spaces therebetween. The bead B23b seals around the hole 20 when the gasket B is compressed, and the bead B23c operates as a space forming member.

The lower plate B24 includes a curved portion B24a around the hole 20, and a flange B24b situated above the upper plate B22. Since the curved portion B24a is formed around the hole 20, fluid passing through the hole 20 does not enter the spaces between the plates.

In the gasket B, two ring members B27 are attached onto an inner portion of the lower plate B24 around the hole 21. The ring members B27 are fixed to the upper and lower plates B22, B24 by spot welding. The ring members B27 are not compressed when the gasket B is tightened.

When the gasket B is tightened, the plates are compressed to the thickness at the ring members B27. Therefore, the bead B23b is compressed and seals around the hole 20. Spaces are kept inside the plates by means of the corrugations B23a and the bead B23c, so that heat is radiated by the plates, and heat transmission between the cylinder head and the inlet manifold is reduced. The gasket B operates as in the gasket A.

Figure 7:
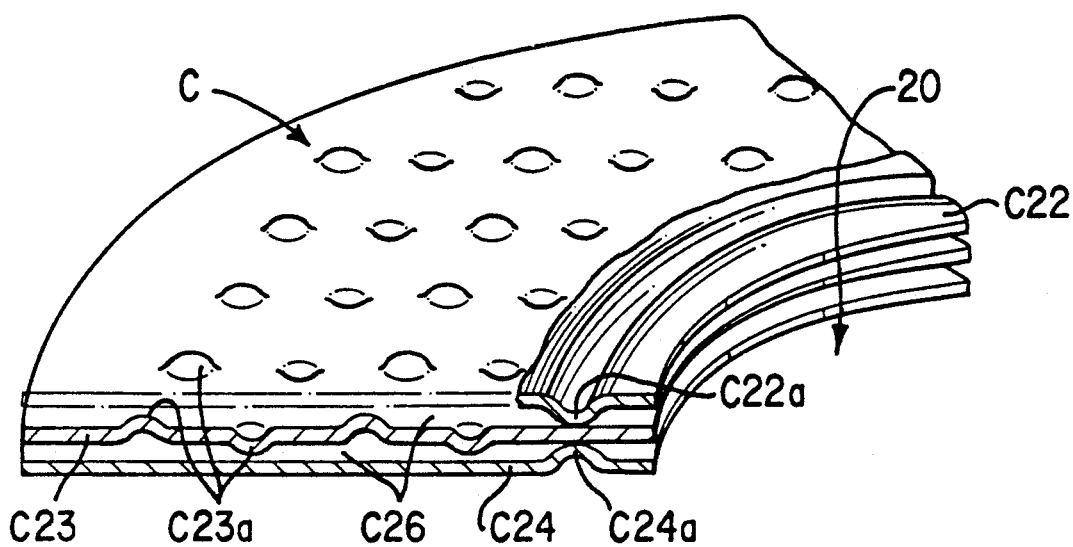
FIG. 7 is a perspective section view, similar to FIG. 5, of a third embodiment of a metal gasket of the invention.

FIG. 7 shows a third embodiment C of a metal gasket of the invention. The gasket C includes an upper plate C22 with a bead C22a, a middle plate C23, and a lower plate C24 with a bead C24a, as in the gasket A.

In the gasket C, however, the middle plate C23 is provided with a plurality of small projections C23a extending upwardly and downwardly therefrom instead of the corrugations A23a of the gasket A. The rest of the structure of the gasket C is the same as the gasket A.

In the gasket C, since the small projections C23a are formed to provide spaces C26 between the plates, insulating air layer is formed. The gasket C operates as in the gasket A.

Figure 8:
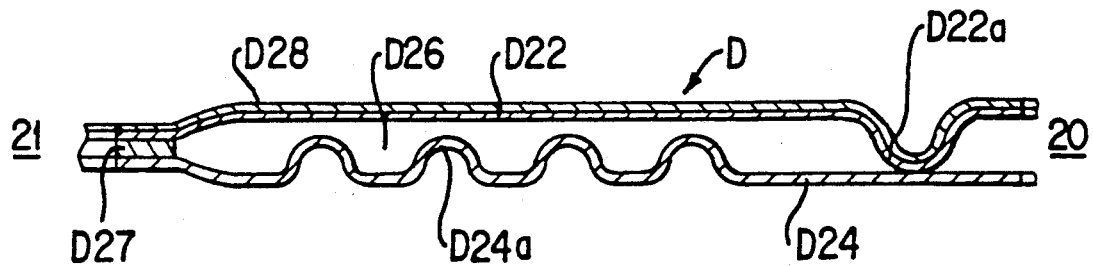
FIG. 8 is a section view, similar to FIG. 3, of a fourth embodiment of a metal gasket of the invention.

FIG. 8 shows a fourth embodiment D of a metal gasket of the invention. The gasket D is formed of two plates, i.e. upper plate D22 and lower plate D24, and a ring member D27 around a hole 21.

The upper plate D22 includes a bead D22a around a hole 20 for sealing therearound, and the lower plate D24 includes corrugations D24a to form a space D26 between the upper and lower plates D22, D24. Also, a heat insulating layer D28 is laminated onto the upper plate D22. The heat insulating layer D28 may be made of ceramics, NBR gum or fluorine gum.

In the gasket D, the heat insulating layer D28 is formed on the upper plate D22. However, the heat insulating layer D28 may be formed on both surfaces of the plate D22 or on the lower plate D24. A desired heat insulating material may be applied onto the plates entirely or partly.

When the gasket D is tightened, the bead D22a seals around the hole 20, and the corrugations D24a form spaces between the plates D22, D24, as in the gasket A. Since the heat insulating layer D28 is formed on the upper plate D22, heat insulating property of the gasket D is improved.

In the present invention, when the gasket is tightened, the gasket is compressed up to a thickness defined by spacers, by which sealing means is compressed to seal around a hole. Since space forming means is provided in the gasket, the plates do not abut against each other, and spaces are formed between the plates. Therefore, heat is partly insulated by the gasket, and heat transmission between the engine parts is reduced.

While the invention has been explained with reference to the specific embodiments of the invention, the explanation is illustrative and the invention is limited only by the appended claims.

What is claimed is:

1. A metal gasket for reducing heat transmission between two engine parts with at least one hole to be sealed, comprising, two plates extending substantially throughout an entire area of the gasket and having at least one first hole corresponding to the hole of the engine parts to be sealed and bolt holes for attaching the plates to the engine parts, sealing means formed around the first hole, said sealing means, when the gasket is tightened, being compressed to securely seal around the hole of the engine parts, space forming means formed on at least one of the plates and provided over a substantial portion of the plate to form a space between the plates without substantial contact between the plates except at the space forming means when the gasket is compressed, spacers formed around the bolt holes, said spacer having a non-compressible thickness less than a thickness of the sealing means before the gasket is compressed so that when the gasket is tightened at the spacers, the sealing means is compressed to said non-compressible thickness of the spacers to securely seal around the hole of the engine parts while the two plates do not closely abut against each other except at said spacers and at said sealing means and provide spaces between the plates by the space forming means to thereby reduce heat transmission between the two engine parts by means of the gasket, and a heat insulating layer formed on at least one of the plates to reduce heat transmission to the plate from the engine part.

2. A metal gasket according to claim 1, wherein said space forming means is a plurality of projections formed on at least one of the plates.

3. A metal gasket according to claim 2, wherein said projections are beads.

4. A metal gasket according to claim 2, wherein said sealing means is at least one bead formed on one of the plates around the first hole.

5. A metal gasket according to claim 4, further comprising an outer periphery having spaces between the plates to radiate heat from the gasket through the spaces.

6. A metal gasket according to claim 1, wherein said heat insulating layer is formed on an entire outer surface of a plate contacting the engine part.

7. A metal gasket according to claim 6, wherein said heat insulating layer is made of one material selected from the group consisting of ceramics, NBR gum and fluorine gum.

* * * * *